Patented Feb. 9, 1932

1,844,391

UNITED STATES PATENT OFFICE

ALPHONS O. JAEGER AND ROBERT AMES NORTON, OF CRAFTON, PENNSYLVANIA, ASSIGNORS TO THE SELDEN COMPANY, OF PITTSBURGH, PENNSYLVANIA, A CORPORATION OF DELAWARE

OXIDATION OF ACENAPHTHENE

No Drawing.   Application filed September 7, 1928.   Serial No. 304,614.

This invention relates to processes of oxidizing acenaphthene substances catalytically in the vapor phase.

It has been proposed to oxidize acenaphthene catalytically in the presence of air or other oxidizing gases using metal oxide catalysts, such as vanadium oxide and oxides of the other metal elements of the fifth and sixth groups of the periodic system. This process has been almost a complete failure commercially because the yields obtained with metal oxide catalysts are very low and the product is of poor quality, containing many undesired by-products.

We have found that the reason for the lack of success is due primarily to the use of metal oxide catalysts. Contrary to the opinion held hitherto that these catalysts are the most effective, we have found that they are practically worthless for commercial production and that, surprising as it may seem, good yields of a product of very satisfactory and in some cases complete purity can be obtained when salts of the metal acids of the fifth and sixth groups of the periodic system are used. These salts are preferably of metals other than the alkali or alkaline earth metals. Especially effective salts are the vanadates, vanadites and molybdates of iron, silver, manganese, aluminum, etc. Other salts, such as those of nickel, cobalt, copper, chromium, titanium, zirconium, thorium, cerium, lead, cadmium, zinc, etc. may also be used but are somewhat less effective, although still far superior to metal oxide catalysts. Salts of other metal acids of the fifth and sixth groups, such as tungstates, chromates, uranates, tantalates, columbates, and the like, are also effective, although not quite as efficient as the salts of the metal acids of vanadium and molybdenum. Complex salts such as the highly porous puffed vanadyl vanadates particularly those of silver, copper and the alkali metals, may also be used and constitute very effective contact masses owing to the extremely fine porous structure produced when the salt is formed with evolution of oxygen. It should be understood that we do not claim the use of puffed vanadyl vanadates as contact masses for organic oxidations generally, this forming part of the subject matter of the prior patent to A. O. Jaeger, No. 1,709,853, dated April 23, 1929.

In many cases it is desirable to use mixtures of two or more different salts of the same metal acid or of different metal acids, and such combined contact masses are included in the present invention.

We have found that the general reaction conditions using ordinary commercial acenaphthene, for example acenaphthene of from 80–90% purity, are similar to those under which anthracene may be oxidized to anthraquinone with the same or similar contact masses. In fact, strange as it may seem, many of the contact masses which favor the oxidation of anthracene to anthraquinone also favor the oxidation of acenaphthene to its oxidation products, such as acenaphthylene, acenaphthaquinone, bisacenaphthylidenedione, naphthaldehydic acid, naphthalic anhydride and hemimellitic acid. The reaction conditions will vary, of course, depending on what products are desired. Thus, in general, most contact masses which are satisfactory for the oxidation of anthracene to anthraquinone when used at temperatures around 400° C. or higher result in the production of naphthalic anhydride as the main and in many cases the only product. Less active contact masses at lower temperatures, with lower oxygen concentrations, permit the production of other intermediate products, especially those of lower stages of oxidation than naphthalic anhydride. In most cases naphthalic anhydride is produced to some extent even when the reaction conditions are chosen to favor the production of the lower oxidation products as this intermediate product appears to be extremely stable, more so than the other oxidation products. It is an advantage of the present invention that under suitable reaction conditions naphthalic anhydride can be produced by means of the metal salt catalysts of the present invention with good yields and of a very satisfactory purity.

Catalytically effective metal salts of the present invention may be used as such but are preferably impregnated or coated onto natural or artificial carrier material which may, for example, be of a finely porous nature, such as pumice fragments, "celite" brick fragments, etc., or may have a roughened surface, such as etched quartz fragments, quartz filter stone fragments, etched metal granules, such as those of aluminum or various ferrous alloys, and the like. In fact any suitable carrier material may be used in preparing metal salt contact masses of the present invention, and the above carriers have been mentioned merely as illustrations of a few typical materials which can be used.

While the invention is not limited to the nature of the oxidizing gases used we have found that the best results are obtained when steam is present as a diluent of the oxygen. The presence of steam appears to smooth the reaction and gives better yields of a purer product, especially when acenaphthene is oxidized to naphthalic anhydride. The purity of product is due in part to the faculty possessed by steam of suppressing undesired side reactions, such as, for example, the polymerization or condensation of acenaphthene, or its lower stages of oxidation, and partly because the steam makes it possible to effect a very clean separation of naphthalic anhydride since the latter is transformed into the acid at temperatures around 140–150° C., and if the exhaust gases from the converter are cooled down to about this point practically pure naphthalic acid separates out, whereas most of the other impurities present are volatile in the presence of steam at this temperature. The use of steam in the catalytic oxidation of acenaphthene may, therefore, be considered as the preferred embodiment of the present invention, which, however, is in no sense limited thereto.

The invention will be described in greater detail in connection with the following specific examples which describe a few represenative embodiments of the process.

Example 1

18.2 parts of $V_2O_5$ are dissolved in 250 parts of potassium hydroxide solution containing 22.6 parts of 100% KOH. 27 parts of ferric sulfate are dissolved in 300 parts of water at 50–60° C. and the potassium vanadate solution is then poured in with vigorous agitation. The yellow precipitate of ferric vanadate obtained is filtered with suction and washed with water until the filtrate is colorless. Thereupon the wet cake is sludged in 200 parts of water and the suspension uniformly coated onto 500 volumes of 8–12 mesh pumice fragments by spraying it onto the fragments which are agitated and maintained at sufficiently high temperature so that the water of the suspension is immediately evaporated on striking the fragments. The contact mass is filled into a converter and blown with air at 350–400° C. Thereupon acenaphthene of various grades of purity, for example 80–90%, is uniformly vaporized into an air stream in the ratio of 1:20–30 by weight and passed over the contact mass at 370–400° C. Naphthalic anhydride is obtained practically chemically pure and a large proportion of the product can be used as a dyestuff intermediate without further purification. It is desirable to maintain the temperature of the reaction constant, which can be effectively achieved by using a tubular converter with a boiling metal bath as a temperature regulating medium. The bath may be mercury, boiling under suitable pressure, or an alloy of mercury, boiling under atmospheric pressure, the alloys being preferable. Examples are mercury-cadmium and mercury-lead and when the latter is used it should contain about 30 parts of mercury to 70 parts of lead. The tubes of the converter should preferably have a ¾ of an inch internal diameter and the depth of the contact mass in the tubes should be from 9 to 12 inches.

Instead of using ferric pyrovanadate, other iron salts of vanadic acid or complex compounds of vanadic acid may be used and, if desired, the vanadic acid may be replaced partly or wholly by corresponding acids of other metals of the fifth and sixth groups of the periodic system, such as molybedenum, tungsten, uranium, chromium, tantalum, or columbium. They may be used singly or in admixture. Some of these contact masses will give larger or smaller amounts of hemimellitic acid and maleic acid in addition to naphthalic anhydride but these products can be easily separated from the naphthalic anhydride by washing with hot water and then can be recovered and utilized.

Steam may advantageously be used in carrying out the reaction described above. This results in smoothing out the reaction, permitting high yields and also aids in the separation of other oxidation products from naphthalic anhydride. The amount of steam may vary within wide limits and may be introduced into the reaction gas in the form of moist air or steam before the gases pass over the contact mass.

Instead of using iron salts of the metal acids of the fifth and sixth groups of the periodic system, they may be partly or wholly replaced by one or more similar salts of copper, nickel, cobalt, silver, aluminum, titanium, zirconium, manganese, or cerium. Instead of using roughened quartz fragments as carriers, quartz filter stones, sand stones, "celite" bricks, fragments of natural or artificial silicates, base exchange bodies, especially zeolites preferably diluted with materials rich in silica, aluminum granules, or granules of ferrous alloys as ferrosilicon or ferrovanadium may be employed.

The reaction product obtained will vary with the reaction conditions, especially concentration of acenaphthene in the air, the temperature and the amount of steam used, if any. Thus, it is possible to obtain in addition to naphthalic anhydride larger or smaller quantities of acenaphthaquinone, naphthaldehydic acid, or bisacenaphthyidenedione. In some cases acenaphthylene is also obtained. The lower oxidation products, such as acenaphthylene, acenaphthaquinone and naphthaldehydic acid, are obtained as the main products when the ratio of oxygen to acenaphthene is comparatively low, as, for example, when it is in the proportion of 1:5–10, and when lower temperatures are used, as 340–380° C. With higher oxygen content, as described in the earlier part of the example, and at a temperature of about 400° C. naphthalic anhydride of a high purity is obtained.

Example 2

9.1 parts of $V_2O_5$ are dissolved in 150 parts of potassium hydroxide solution containing 11.3 parts of 100% KOH. 33.1 parts of lead nitrate are dissolved in 150 parts of water at 50–60° C. and the potassium vanadate solution is then poured in with vigorous agitation. The lead vanadate precipitate is filtered with suction and washed with water to free it from the mother liquor. The wet cake is then sludged with 200 parts of water and the suspension coated uniformly onto 250 volumes of etched 8–12 mesh quarts fragments as described in the foregoing example. The quartz fragments are etched by boiling 720 parts of 8–10 mesh quartz in a solution which is prepared by dissolving up the aluminum hydroxide freshly precipitated from 112 parts of aluminum sulfate with 18 mols of water in 675 parts of 90% KOH in 300 parts of water. The quartz is poured into the boiling solution and boiled for about three hours and then washed with water and treated with a very dilute hydrochloric acid solution until a methyl-red indicator turns. The contact mass is filled into a converter and acenaphthene of different grades is vaporized with air in the ratio of 1:20 and passed over the contact mass at 380–420° C. Acenaphthylene of a high purity is obtained as the main product.

Example 3

300 parts of $V_2O_5$ are intimately mixed with about 93 parts of silver nitrate and melted together. The melt is permitted to cool, going over into the puffed, porous silver vanadyl vanadate with evolution of oxygen and after complete cooling is broken into pea-sized fragments which are filled into a converter and acenaphthene of 80% purity or substituted acenaphthenes are vaporized with air and steam in the proportion of 1:30:10 by weight and passed over the contact mass at 370–390° C. Naphthalic anhydride of high purity is obtained as the main product. Instead of or in addition to the silver vanadyl vanadate, one or more of the corresponding vanadyl vanadates of sodium, potassium, lithium, rubidium or cæsium may be used. These vanadyl vanadates are preferably prepared with the following rations of $V_2O_5$ to the base:

$V_2O_5$ to $Na_2O$ as 6:1
$V_2O_5$ to $K_2O$ as 5:1
$V_2O_5$ to $Li_2O$ as 2:1
$V_2O_5$ to $Rb_2O$ as 5:1
$V_2O_5$ to $Cs_2O$ as 5:1

The present invention is applicable to the oxidation of acenaphthene or its halogen derivatives. All of these products will be included under the general term "acenaphthene substances" which will be used in the specification and claims in this sense and in this sense only.

What is claimed as new is:

1. A method of oxidizing acenaphthene substances which comprises vaporizing the acenaphthene substances admixing the vapors with an oxidizing gas and passing them over a contact mass containing at least one salt of a metal acid of the fifth and sixth groups of the periodic system with a metal other than an alkali forming metal.

2. A method of oxidizing acenaphthene substances which comprises vaporizing the acenaphthene substances, admixing the vapors with an oxidizing gas and passing them over a contact mass containing at least one salt of an acid of vanadium other than an alkali forming metal salt.

3. A method of oxidizing acenaphthene substances which comprises vaporizing the acenaphthene substances, admixing the vapors with an oxidizing gas and passing them over a contact mass containing at least one vanadate of a metal other than an alkali-forming metal.

4. A method of oxidizing acenaphthene substances which comprises vaporizing the acenaphthene substances, admixing the vapors with an oxidizing gas and passing them over a contact mass containing at least one vanadate of a heavy metal which is non-alkali-forming.

5. A method of oxidizing acenaphthene substances which comprises vaporizing the acenaphthene substances admixing the vapors with an oxidizing gas and passing them over a contact mass containing iron vanadate.

6. A method of oxidizing acenaphthene substances which comprises vaporizing the acenaphthene substances, admixing the vapors with an oxidizing gas in the presence of steam, and passing them over a contact mass containing at least one salt of a metal acid of the fifth and sixth groups of the periodic system with a metal other than an alkali forming metal.

7. A method of oxidizing acenaphthene substances which comprises vaporizing the acenaphthene substances, admixing the vapors with an oxidizing gas in the presence of steam, and passing them over a contact mass containing at least one salt of an acid of vanadium other than an alkali forming metal salt.

8. A method of oxidizing acenaphthene substances which comprises vaporizing the acenaphthene substances, admixing the vapors with an oxidizing gas in the presence of steam, and passing them over a contact mass containing at least one vanadate of a metal other than an alkali-forming metal.

9. A method of oxidizing acenaphthene substances which comprises vaporizing the acenaphthene substances, admixing the vapors with an oxidizing gas in the presence of steam, and passing them over a contact mass containing at least one vanadate of a heavy metal which is non-alkali-forming.

10. A method of oxidizing acenaphthene substances which comprises vaporizing the acenaphthene substances, admixing the vapors with an oxidizing gas in the presence of steam, and passing them over a contact mass containing an iron vanadate.

11. A method of oxidizing acenaphthene which comprises vaporizing the acenaphthene, admixing the vapors with an oxidizing gas and passing them over a contact mass containing at least one salt of a metal acid of the fifth and sixth groups of the periodic system with a metal other than an alkali forming metal.

Signed at Pittsburgh, Pennsylvania, this 28th day of August, 1928.

ALPHONS O. JAEGER.
ROBERT AMES NORTON.